US012236762B2

(12) United States Patent
Berglund et al.

(10) Patent No.: US 12,236,762 B2
(45) Date of Patent: *Feb. 25, 2025

(54) RECOILER FOR A MERCHANDISE SECURITY SYSTEM

(71) Applicant: InVue Security Products, Inc., Charlotte, NC (US)

(72) Inventors: David N. Berglund, Indian Trail, NC (US); Kyle Baker, Waxhaw, NC (US); Robert Bisesti, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,458

(22) Filed: Aug. 4, 2023

(65) Prior Publication Data

US 2023/0377431 A1 Nov. 23, 2023

Related U.S. Application Data

(60) Continuation of application No. 17/729,576, filed on Apr. 26, 2022, now Pat. No. 11,756,395, which is a (Continued)

(51) Int. Cl.
*G08B 13/14* (2006.01)
*B65H 75/26* (2006.01)
(Continued)

(52) U.S. Cl.
CPC ....... *G08B 13/1463* (2013.01); *B65H 75/265* (2013.01); *B65H 75/48* (2013.01); (Continued)

(58) Field of Classification Search
CPC .............................. G08B 1/00; G08B 13/1463
See application file for complete search history.

(56) References Cited

U.S. PATENT DOCUMENTS 2,873,822 A * 2/1959 Sloan ..................... B23Q 16/04 188/68
3,128,857 A * 4/1964 Walton ................... H02G 11/02 242/388.6
(Continued)

FOREIGN PATENT DOCUMENTS

DE 102009049738 A1 4/2011
GB 2363422 A 12/2001
(Continued)

OTHER PUBLICATIONS

"Series S1500 Alarm-on-merchandise: proven to provide superior production.", 2015, 8 pages, InVue Security Products Inc.
(Continued)

*Primary Examiner* — Hoi C Lau
(74) *Attorney, Agent, or Firm* — InVue Security Products Inc.

(57) ABSTRACT

Embodiments of the present invention are directed to recoilers, merchandise security systems, and methods for displaying and protecting an article of merchandise from theft. In one example, the merchandise security system includes a sensor configured to be secured to the article of merchandise and a base for removably supporting the sensor and the item of merchandise thereon. The system also includes a recoiler operably coupled to the sensor. The recoiler includes a rotatable member defining a helical recess. The system further includes a cable configured to connect to the sensor and to be unwound from and wound on the rotatable member as the cable is extended and retracted. The cable is configured to be extended from the recoiler in response to the sensor being lifted off of the base, and the cable is configured to be retracted into the recoiler in response to the sensor being moved to a seated position on the base. The helical
(Continued)

recess is configured to at least partially receive the cable therein as the cable is wound on the rotatable member.

18 Claims, 10 Drawing Sheets

Related U.S. Application Data continuation of application No. 16/784,796, filed on Feb. 7, 2020, now abandoned, which is a continuation of application No. 16/554,016, filed on Aug. 28, 2019, now Pat. No. 10,559,176, which is a continuation of application No. 16/109,200, filed on Aug. 22, 2018, now Pat. No. 10,403,105, which is a continuation of application No. 15/957,519, filed on Apr. 19, 2018, now Pat. No. 10,068,444, which is a continuation of application No. 15/926,326, filed on Mar. 20, 2018, now Pat. No. 10,043,358, which is a continuation of application No. 15/725,951, filed on Oct. 5, 2017, now Pat. No. 9,928,704, which is a continuation of application No. 15/649,127, filed on Jul. 13, 2017, now Pat. No. 9,805,564, which is a continuation of application No. 15/593,640, filed on May 12, 2017, now Pat. No. 9,747,765, which is a division of application No. 15/474,338, filed on Mar. 30, 2017, now Pat. No. 9,761,101, which is a continuation of application No. PCT/US2016/056239, filed on Oct. 10, 2016.

(60) Provisional application No. 62/297,215, filed on Feb. 19, 2016, provisional application No. 62/240,171, filed on Oct. 12, 2015.

(51) Int. Cl.

*B65H 75/48* (2006.01)
*E05B 73/00* (2006.01)
*G08B 13/12* (2006.01)
*A47F 7/024* (2006.01)

(52) U.S. Cl.

CPC ........ *E05B 73/0082* (2013.01); *G08B 13/126* (2013.01); *G08B 13/1409* (2013.01); *A47F 7/024* (2013.01)

(56) References Cited

U.S. PATENT DOCUMENTS 3,147,833 A * 9/1964 McWilliams ........... B26B 19/38 439/4
3,338,077 A * 8/1967 Kaneda ................... B60R 25/04 70/252
3,617,659 A * 11/1971 Freeman ................ H02G 11/02 242/385
3,913,880 A * 10/1975 Lucasey .............. E05B 73/0082 248/553
4,073,449 A * 2/1978 Pilat ....................... H02G 11/02 242/379
4,305,266 A * 12/1981 Lockwood .......... E05B 73/0082 248/553
5,003,292 A * 3/1991 Harding ............. G08B 13/1445 340/568.4
5,156,242 A * 10/1992 Ditzig ..................... H04M 1/15 191/12.4
5,375,786 A * 12/1994 Ta-Yueh ............. B65H 75/4423 242/397.3
5,912,619 A * 6/1999 Vogt ................... G08B 13/1481 340/541
6,050,622 A * 4/2000 Gustafson ................. E06B 9/68 70/57.1
6,150,940 A * 11/2000 Chapman ............... G08B 13/14 340/687
6,169,295 B1 * 1/2001 Koo ...................... H01L 31/167 438/26
6,598,433 B1 * 7/2003 Malvasio ................ E05B 73/00 70/59
6,648,520 B2 * 11/2003 McDonald ........... G02B 6/3894 385/59
6,799,994 B2 * 10/2004 Burke .................... H02G 11/00 439/501
6,848,282 B2 * 2/2005 Palzkill ................ B62D 53/085 70/229
6,888,461 B2 * 5/2005 Houde ............... G08B 13/1463 340/568.1
7,209,038 B1 * 4/2007 Deconinck ......... G08B 13/1445 340/568.1
7,239,238 B2 * 7/2007 Tester ................... G09F 3/0347 292/307 R
7,327,276 B1 * 2/2008 Deconinck ......... G08B 13/1409 340/687
7,667,601 B2 * 2/2010 Rabinowitz ........ G08B 13/1961 340/568.2
7,710,266 B2 * 5/2010 Belden, Jr. .............. A47F 7/024 340/568.8
7,984,886 B2 * 7/2011 Lin ..................... B60R 11/0252 108/44
8,191,851 B2 * 6/2012 Crown ................ B60R 11/0241 248/316.4
8,395,907 B2 * 3/2013 Marszalek ......... G08B 13/1445 361/825
8,558,688 B2 * 10/2013 Henson ................. G06F 1/1626 340/539.1
8,579,659 B2 * 11/2013 Tran ..................... H01R 13/625 439/578
8,696,377 B2 * 4/2014 Kelsch ............... H01R 13/6397 200/51.09
8,698,617 B2 * 4/2014 Henson ................. G06F 1/1626 340/539.1
8,698,618 B2 * 4/2014 Henson ............. G08B 13/1472 340/539.1
8,701,452 B2 * 4/2014 Foster ................. E05B 73/0082 248/316.4
8,909,008 B1 * 12/2014 Tzeng .................. G02B 6/3604 385/25
9,353,552 B1 * 5/2016 Kelsch ....................... A47F 5/00
9,443,404 B2 * 9/2016 Grant ................. G08B 13/1445
D793,779 S * 8/2017 Van Landingham, Jr. .................. D6/682.1
9,747,765 B1 * 8/2017 Berglund ............. B65H 75/265
9,761,101 B2 * 9/2017 Berglund ............. B65H 75/265
D798,636 S * 10/2017 Van Landingham, Jr. .. D14/434
9,805,564 B1 * 10/2017 Berglund ............... B65H 75/48
9,811,988 B2 * 11/2017 Grant ................. G08B 13/1445
9,818,274 B2 * 11/2017 Fawcett ............. G08B 13/1463
9,928,704 B2 * 3/2018 Berglund ............... B65H 75/48
9,972,178 B2 * 5/2018 Richardson ........ G06Q 30/0185
10,043,358 B1 * 8/2018 Berglund ............... B65H 75/48
10,062,253 B2 * 8/2018 Fawcett ............. G08B 13/1481
10,068,444 B1 * 9/2018 Berglund ............. B65H 75/265
10,098,481 B2 * 10/2018 Berglund ............ E05B 73/0005
10,290,192 B2 * 5/2019 Grant ................. G08B 13/1445
10,373,457 B2 * 8/2019 Fawcett ............. G08B 13/1481
10,373,458 B2 * 8/2019 Selinger ............... G08B 13/196
10,403,105 B2 * 9/2019 Berglund ............. G08B 13/126
10,403,106 B2 * 9/2019 Fawcett ............. G08B 13/1481
10,535,240 B2 * 1/2020 Fawcett ............. G08B 13/1481
10,559,176 B2 * 2/2020 Berglund ........... G08B 13/1409
11,756,395 B2 * 9/2023 Berglund ............. G08B 13/126 340/568.2
2006/0049587 A1 * 3/2006 Cornwell ............ B23B 31/1071 279/75
2006/0097875 A1 * 5/2006 Ott ..................... G08B 13/1436 340/572.1
2008/0142665 A1 * 6/2008 Belden ................... F16M 11/10 248/417
2010/0079285 A1 * 4/2010 Fawcett ............... G08B 13/149 70/57.1

(56) References Cited

U.S. PATENT DOCUMENTS

2010/0176945 A1* 7/2010 Fawcett ............. G08B 13/1445 340/568.1
2010/0315237 A1* 12/2010 Yang .................. G08B 13/2434 340/572.8
2011/0013905 A1* 1/2011 Wang ..................... G01M 11/33 398/21
2011/0062294 A1* 3/2011 Johnson ................. F16M 11/00 248/161
2011/0133050 A1* 6/2011 Eisenberger, Sr. .... F16M 13/00 70/58
2011/0187531 A1* 8/2011 Oehl .................. G08B 13/1445 340/568.1
2011/0254661 A1* 10/2011 Fawcett ............. G08B 13/2434 340/5.61
2011/0309928 A1* 12/2011 Henson .................... G08B 7/06 340/568.8
2011/0309934 A1* 12/2011 Henson .............. G08B 13/1472 340/568.8
2012/0120571 A1* 5/2012 Bisesti ............... H01R 13/5841 361/679.01
2012/0188082 A1* 7/2012 Berglund ........... G08B 13/1445 340/568.2
2012/0205326 A1* 8/2012 Richter ................... A47F 7/024 307/38
2012/0268103 A1* 10/2012 Henson ................... G06F 1/266 307/104
2013/0026322 A1* 1/2013 Wheeler ................ F16M 13/02 248/288.11
2013/0168527 A1* 7/2013 Wheeler ................. A47F 7/024 248/553
2013/0196530 A1* 8/2013 Cheatham .............. H01R 43/26 439/502
2014/0118930 A1* 5/2014 Sedon ..................... G06F 21/88 361/679.56
2014/0159898 A1* 6/2014 Wheeler ................ G08B 25/10 340/568.2
2014/0226298 A1* 8/2014 Palmer .................. A47F 7/0246 361/807
2014/0263873 A1* 9/2014 Kim ................... G08B 13/1463 248/74.1
2014/0328020 A1* 11/2014 Galant ................. F16M 11/105 361/679.56
2014/0335730 A1* 11/2014 Grant ................. H01R 13/6683 439/620.01
2015/0028145 A1* 1/2015 Johnston ............ B65H 75/4484 242/390.8
2015/0208826 A1* 7/2015 Yang .................... F16M 11/041 248/316.1
2015/0235533 A1* 8/2015 Grant ................. G08B 13/1445 340/568.2
2015/0305518 A1* 10/2015 Galant .................. A47F 7/0246 29/525.08
2016/0087726 A1* 3/2016 Roberds ................... G02B 6/46 398/119
2016/0159611 A1* 6/2016 Wheeler ................. A47F 7/024 242/382.4
2016/0351029 A1* 12/2016 Fawcett ............. G08B 13/1463
2016/0379455 A1* 12/2016 Grant ................. G08B 13/1445 340/568.2
2017/0032636 A1* 2/2017 Henson .............. G08B 13/1463
2017/0206759 A1* 7/2017 Berglund ........... G08B 13/1463
2017/0245663 A1* 8/2017 Berglund ............... G08B 13/14
2017/0249814 A1* 8/2017 Berglund ........... G08B 13/1463
2017/0323538 A1* 11/2017 Berglund ............... B65H 75/48
2018/0025598 A1* 1/2018 Fawcett ............. G08B 13/1481 340/568.2
2018/0033268 A1* 2/2018 Berglund ........... G08B 13/1463
2018/0061197 A1* 3/2018 Grant ................. G08B 13/1445
2018/0211497 A1* 7/2018 Berglund ............. B65H 75/265
2018/0240315 A1* 8/2018 Berglund ............... B65H 75/48
2019/0012889 A1* 1/2019 Berglund ............ E05B 73/0082
2019/0385425 A1* 12/2019 Berglund ............. G08B 13/126
2020/0152028 A1 5/2020 Fawcett et al.
2020/0175830 A1* 6/2020 Berglund ............... B65H 75/48
2022/0246003 A1* 8/2022 Berglund ........... G08B 13/1463
2023/0377431 A1* 11/2023 Berglund ........... G08B 13/1463

FOREIGN PATENT DOCUMENTS

WO 2002073561 A1 9/2002
WO 2009103793 A1 8/2009
WO 2011045058 A2 4/2011
WO 2012069816 A1 5/2012
WO 2014019072 A1 2/2014
WO 2014078966 A1 5/2014
WO 2014160758 A1 10/2014
WO 2015053913 A1 4/2015
WO 2015112670 A1 7/2015
WO 2016033037 A1 3/2016

OTHER PUBLICATIONS

"Series HS150 Easy-Lift™ high security.", 2015, 8 pages, InVue Security Products Inc.
"Series HS400 Thieves won't beat it. Customers will love it.", 2015, 8 pages, InVue Security Products Inc.
International Search Report and Written Opinion from corresponding International Application No. PCT/US2016/056239 dated Feb. 1, 2017 (16 pages).
Extended European Search Report from corresponding European Patent Application No. 16855999.5, dated Feb. 9, 2018 (10 pages).
"MTI Freedom LP3 Brochure," Mobile Technologies, Inc., dated Sep. 2009 (1 page).
"MTI Freedom LP3 Product Manual," Mobile Technologies, Inc., dated Mar. 2010 (20 pages).
"MTI Freedom LP3 Product Manual," Mobile Technologies, Inc., dated Mar. 2011 (25 pages).
"MTI Freedom LP3 Quick Reference Guide," Mobile Technologies, Inc., dated Feb. 2010 (2 pages).
"MTI Freedom One Product Manual," Mobile Technologies, Inc., dated Jun. 2011 (32 pages).
"MTI Freedom One Product Manual," Mobile Technologies, Inc., dated Jun. 2012 (32 pages).
"MTI Freedom One Sell Sheet," Mobile Technologies, Inc., dated 2012 (2 pages).
"Instructions for SinglePro," Protex International Corp., dated 2007 (8 pages).
"Stand-Alone Power and Security Flexible Enough for End Caps or for Promotions," Protex International Corp., dated 2008 (2 pages).
Defendant's Preliminary Invalidity Contentions, *InVue Security Products Inc.* v. *Vanguard Products Group, Inc., d/b/a Vanguard Protex Global*, Civil Case No. 8:18-cv-02548-VMC-SPF, (M.D. Fla. 2019) (29 pages).
Exhibit A—Invalidity Claim Charts of the '274 Patent, *InVue Security Products Inc.* v. *Vanguard Products Group, Inc., d/b/a Vanguard Protex Global*, Civil Case No. 8:18-cv-02548-VMC-SPF, (M.D. Fla. 2019) (48 pages).
Exhibit B—Invalidity Claim Charts of the '253 Patent, *InVue Security Products Inc.* v. *Vanguard Products Group, Inc., d/b/a Vanguard Protex Global*, Civil Case No. 8:18-cv-02548-VMC-SPF, (M.D. Fla. 2019) (23 pages).
Petition for Inter Partes Review of U.S. Pat. No. 9,818,274, filed on Jun. 17, 2019 (87 pages).
Petition for Inter Partes Review of U.S. Pat. No. 10,062,253, filed on Jun. 17, 2019 (77 pages).
Weik, Martin H. Excerpts, "Communications Standard Dictionary, Third Edition." Chapman & Hall, 1996.
Excerpts, "The American Heritage Dictionary, Fifth Edition." Houghton Mifflin, 2012.
Corrected Petition for Inter Partes Review of U.S. Pat. No. 9,747,765, dated Oct. 17, 2019, 85 pages (IPR2020-00048).
Petition for Inter Partes Review of U.S. Pat. No. 9,805,564, dated Oct. 18, 2019, 86 pages (IPR2020-00066).
Petition for Inter Partes Review of U.S. Pat. No. 10,043,358, dated Oct. 18, 2019, 88 pages (IPR2020-00069).

(56) References Cited

OTHER PUBLICATIONS

Decision to Institute Inter Partes Review of U.S. Pat. No. 9,747,765, dated Mar. 30, 2020, IPR220-00048 (35 pages).
Decision to Institute Inter Partes Review of U.S. Pat. No. 9,805,564, dated Mar. 30, 2020, IPR2020-00066 (45 pages).
Decision to Institute Inter Partes Review of U.S. Pat. No. 10,043,358, dated Apr. 7, 2020, IPR2020-00069 (60 pages).

* cited by examiner

RECOILER FOR A MERCHANDISE SECURITY SYSTEM

CROSS REFERENCE TO RELATED APPLICATIONS

This application is a continuation of U.S. application Ser. No. 17/729,576 filed on Apr. 26, 2022, which is a continuation of U.S. application Ser. No. 16/784,796, filed on Feb. 7, 2020, which is a continuation of U.S. application Ser. No. 16/554,016, filed on Aug. 28, 2019, now U.S. Pat. No. 10,559,176, which is a continuation of U.S. application Ser. No. 16/109,200, filed on Aug. 22, 2018, now U.S. Pat. No. 10,403,105, which is a continuation of U.S. application Ser. No. 15/957,519, filed on Apr. 19, 2018, now U.S. Pat. No. 10,068,444, which is a continuation of U.S. application Ser. No. 15/926,326, filed on Mar. 20, 2018, now U.S. Pat. No. 10,043,358, which is a continuation of U.S. application Ser. No. 15/725,951, filed on Oct. 5, 2017, now U.S. Pat. No. 9,928,704, which is a continuation of U.S. application Ser. No. 15/649,127, filed Jul. 13, 2017, now U.S. Pat. No. 9,805,564, which is a continuation of U.S. application Ser. No. 15/593,640, filed on May 12, 2017, now U.S. Pat. No. 9,747,765, which is a divisional of U.S. application Ser. No. 15/474,338, filed on Mar. 30, 2017, now U.S. Pat. No. 9,761,101, which is a continuation of International Appl. No. PCT/US2016/056239, filed on Oct. 10, 2016, which claims the benefit of priority to U.S. Provisional Application No. 62/240,171 filed on Oct. 12, 2015, and U.S. Provisional Application No. 62/297,215 filed on Feb. 19, 2016, the entire disclosures of which are incorporated herein by reference.

FIELD OF THE INVENTION

Embodiments of the present invention relate generally to recoilers, security systems, and methods for displaying articles of merchandise in a retail environment.

BACKGROUND OF THE INVENTION

Retailers routinely display articles of merchandise, such as telephones, portable computers (e.g. notebooks, laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price, and hence the profit margin, for such merchandise continues to decline. Accordingly, these articles of merchandise need to be secured by a security device that effectively and cost efficiently protects the merchandise from theft.

BRIEF SUMMARY

Embodiments of the present invention are directed to recoilers, merchandise security systems, and methods for displaying and protecting an article of merchandise from theft. In one example, the merchandise security system includes a sensor configured to be secured to the article of merchandise and a base for removably supporting the sensor and the item of merchandise thereon. The system also includes a recoiler operably coupled to the sensor. The recoiler includes a rotatable member defining a helical recess. The system further includes a cable configured to connect to the sensor and to be unwound from and wound on the rotatable member as the cable is extended and retracted. The cable is configured to be extended from the recoiler in response to the sensor being lifted off of the base, and the cable is configured to be retracted into the recoiler in response to the sensor being moved to a seated position on the base. The helical recess is configured to at least partially receive the cable therein as the cable is wound on the rotatable member.

In one embodiment, a method for displaying and protecting an article of merchandise from theft is provided. The method includes securing a sensor to the article of merchandise, wherein a recoiler is operably coupled to the sensor and comprises a rotatable member defining a helical recess. The method further includes attaching a base to a support surface for removably supporting the sensor and the item of merchandise thereon and connecting a cable to the sensor. The cable is configured to be extended from the base in response to the sensor being lifted off of the base, wherein the cable is configured to be retracted into the base in response to the sensor being moved to a seated position on the base, and the helical recess is configured to at least partially receive the cable therein as the cable is wound on the rotatable member.

In another embodiment a recoiler is provided. The recoiler includes a rotatable member defining a helical recess on an outer surface thereof and a cable configured to be unwound from and wound on the rotatable member as the cable is extended and retracted. The helical recess is configured to at least partially receive the cable therein as the cable is wound on the rotatable member.

In one embodiment, a merchandise security system includes a sensor configured to be secured to the article of merchandise and a base for removably supporting the sensor and the item of merchandise thereon. The merchandise security system also includes a cable configured to be operably connected to the sensor and the base and an auxiliary port disposed within the base and configured to operably connect to an auxiliary device of the item of merchandise. The base is configured to transfer power to the item of merchandise and the auxiliary device, and a sense loop is defined in the cable and the auxiliary port for detecting a security event

BRIEF DESCRIPTION OF THE DRAWING FIGURES

The detailed description of the invention provided hereafter may be better understood with reference to the accompanying drawing figures, in which embodiments of a merchandise security system for displaying an article of merchandise are disclosed, and in which like reference characters indicate the same or similar parts.

DETAILED DESCRIPTION OF EMBODIMENTS OF THE INVENTION

One or more embodiments of a merchandise security system for displaying an article of merchandise are shown in the accompanying drawing figures and described below. The article of merchandise is typically a display model or an operational sample of electronic merchandise, such as portable telephones, smart phones, computers (e.g. notebooks, laptops, tablets, etc.), e-readers, media players, and the like, for a customer to examine before making a decision whether to purchase the article. The article of merchandise is typically displayed in a manner that permits a prospective purchaser to evaluate the operation and features of the merchandise, while protecting the merchandise from theft. In one embodiment, a sensor may be attached to the article of merchandise for detecting various alarming conditions, such as the article being removed from the sensor. A cable may be operably engaged with the sensor at one end, while the opposite end may be secured to a recoiler. As explained in further detail below, the sensor may also be configured to detect an alarming condition of the cable, such as a cutting, severing, removing, or detaching of the cable.

Figure 1:
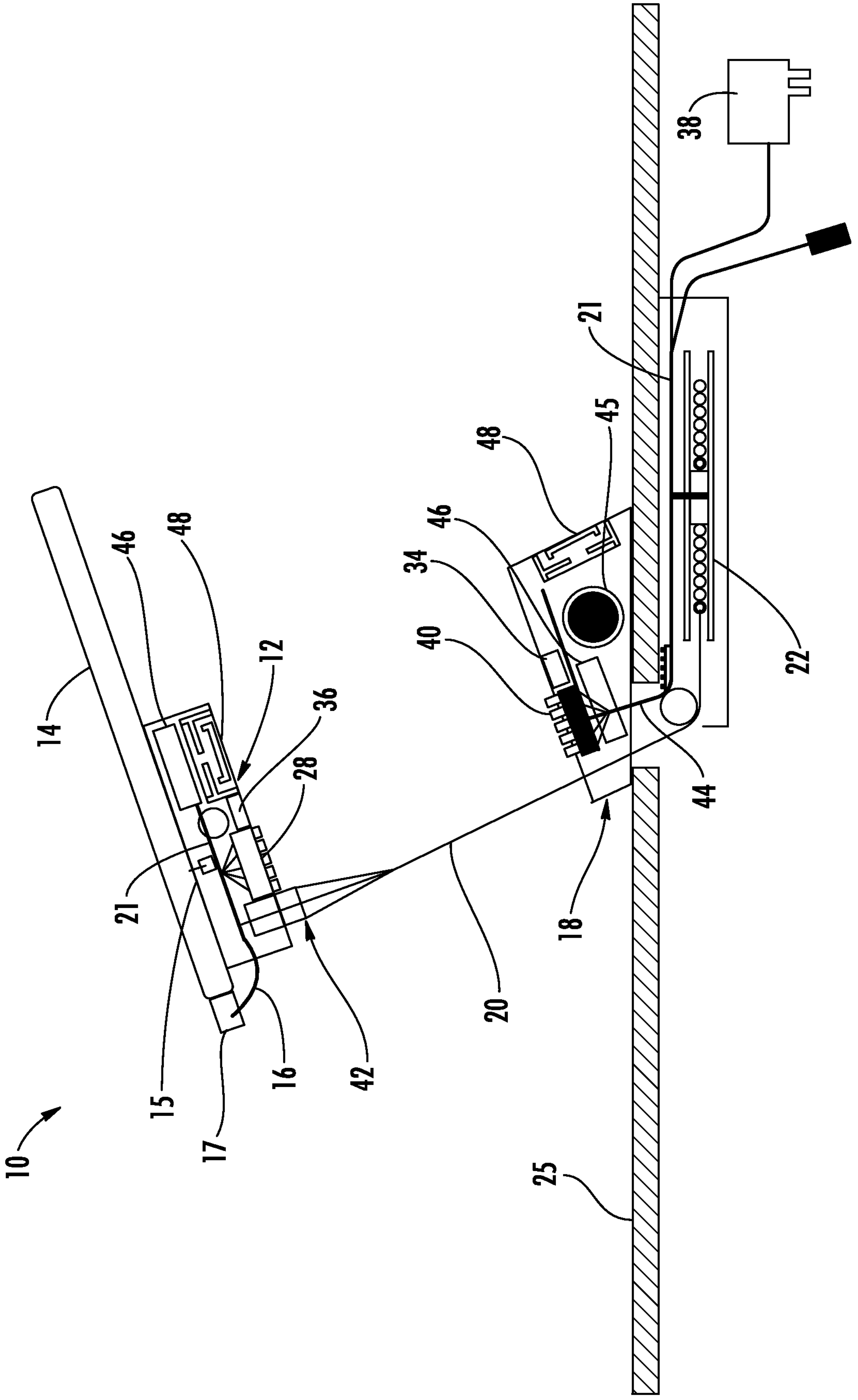
FIG. 1 is a side view of a merchandise security system for displaying and protecting an article of merchandise according to an embodiment of the invention.
Figure 2:
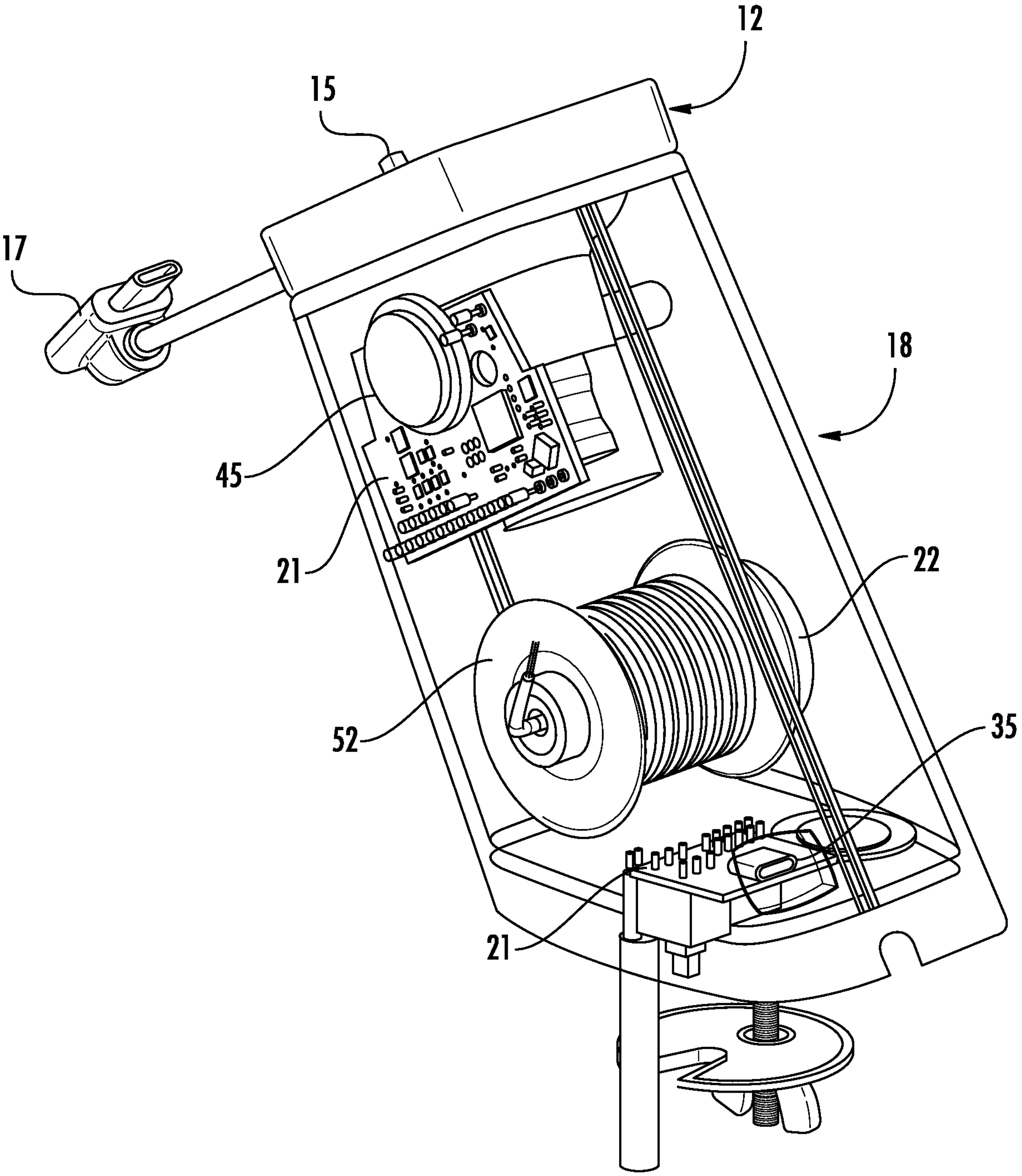
FIG. 2 is a partial perspective view of a merchandise security system according to one embodiment of the present invention.

According to one embodiment shown in FIG. 1, the security system 10 generally comprises a sensor 12 configured to be secured to an item of merchandise 14. The sensor 12 may be electrically connected to a connector 17 that is configured to electrically connect to an input jack of the item of merchandise 14. The security system 10 may also include a base 18 that is configured to removably support the sensor 12 and the item of merchandise 14 thereon. In some embodiments, the base 18 and the sensor 12 include one or more contacts 28, 40 for facilitating contact charging when the sensor is supported on the base (see, e.g., FIGS. 1 and 8). In addition, the security system 10 also includes a cable 20 that is coupled to the sensor 12 at one end and operably engaged with a recoiler 22 at an opposite end. As explained in further detail below, in some embodiments, a sense circuit or loop defined through the cable 20 and the sensor 12 may be electrically isolated from any charging circuit used to charge the sensor 12 and/or the item of merchandise 14. As such, the sense loop may be used to detect various security events associated with the cable 20, such as the cable being cut, shorted, and/or disconnected. The charging circuit allows for charging of the item of merchandise 14 and/or a power source 46 carried by the sensor 12 and/or the base 18. The sensor 12 may also be used to detect security events associated with the sensor and/or the item of merchandise 14, such as the item of merchandise being removed from the sensor.

The sensor 12 may be secured to the item of merchandise 14 using any desired technique, such as an adhesive and/or mechanical brackets. The sensor 12 may have a variety of shapes and sizes for being secured to the item of merchandise 14. In one embodiment shown in FIG. 1, the sensor 12 may include a sensing device 15, such as a pressure or plunger switch, for detecting removal of the item of merchandise 14. In addition, the connector 17 may be configured to be removably inserted into the input jack of the item of merchandise 14. Thus, the sensor 12 and the item of merchandise 14 may be electrically connected via the connector 17. The sensor 12 may include a printed circuit board (PCB) 21, circuitry, or the like. For example, the sensor 12 may include charging circuitry for facilitating power transfer between the base 18 and the item of merchandise 14. The connector 17 may be electrically connected to the PCB 21 using various techniques, such as via a cable 16. In the illustrated embodiment, the connector 17 is mounted to and extends from the sensor 12 but could be positioned at other locations depending on the location of the input port of the item of merchandise 14.

As noted above, the sensor 12 may include one or more electrical contacts 28. In some embodiments, the sensor 12 includes a plurality of electrical contacts 28. The electrical contacts 28 may be in electrical communication with the PCB 21 in the sensor 12 and the connector 17. Alternatively, the electrical contacts 28 may be electrically connected to only the connector 17. In some embodiments, the sensor 12 may not supply power to the item of merchandise 14 when the item is lifted from the base 18. Rather, the item of merchandise 14 may operate using its own power source when lifted from the base 18.

The base 18 may be configured to be supported by a fixed support or display surface 25, such as a counter, shelf, fixture, or the like. The base 18 may be secured to the support surface 25 using any desired technique such as an adhesive, brackets, and/or fasteners. The base 18 may include one or more magnets 34 or magnetic material, and the sensor 12 may include one or more magnets 36 or magnetic material for releasably holding the sensor on the base. The magnets 34, 36 may aid in aligning the item of merchandise 14 in a desired display orientation.

The security system 10 may include a recoiler 22 and a cable 20 as discussed above. The base 18 may include an opening for receiving the cable 20. As such, the cable 20 may be extended through the opening when the sensor 12 and the item of merchandise 14 are lifted from the base, and the cable may be retracted through the opening when the sensor and the item of merchandise are returned to the base. The recoiler 22 may be spring biased in some embodiments such that the cable 20 is automatically retracted within the recoiler. The recoiler 22 may be mounted to an underside of the support surface 25 (see, e.g., FIG. 1), although in other embodiments, the recoiler may be housed within the base 18 and mounted on top of the support surface. Furthermore, the recoiler 22 may be in electrical communication with the cable 20. In this regard, the cable 20 may include one or more electrical conductors extending along the length of the cable. In some cases, the cable 20 may include a pair of conductors for defining a sense loop or circuit and conducting an electrical signal. In other cases, the cable 20 may include a single conductor, such as an optical conductor for conducting an optical signal (e.g., a fiber optic cable).

As discussed above, the base 18 may include one or more electrical contacts 40. The contacts 28, 40 of the base 18 and the sensor 12 are configured to align with one another and contact one another when the sensor is supported on the base. Thus, the base 18 and the sensor 12 are in electrical communication with one another when the sensor is supported on the base. The base 18 may be electrically connected to a power source 38 which is configured to provide power to the base and/or the one or more electrical contacts 40 in the base. The base 18 may include one or more printed circuit boards (PCB) 21, circuitry, or the like for facilitating power transfer. The base 18 may also include charging circuitry that is configured to facilitate power transfer from the external power source 38 and the electrical contacts 40. Thus, when the sensor 12 is supported on the base 18, power is able to be transferred between the contacts 28, 40 and to the sensor 12. The connector 17 is electrically connected to the sensor contacts 28 as power is delivered such that power is provided to the item of merchandise 14. Therefore, the item of merchandise 14 may be powered by power transferred thereto and may be used to charge a battery associated with the item of merchandise. In some embodiments, any voltage adaption occurs prior to being delivered to the sensor 12. Voltage adaption may be needed in order to accommodate different items of merchandise 14 that require different operating voltages. Any voltage adaption may occur prior to power being provided to the contacts 28 on the sensor 12. Thus, the sensor 12 and adapter cable 16 do not provide any voltage adaption. However, in other embodiments, the sensor 12 may include a resistor or other identifier that detects the voltage requirements of the item of merchandise 14 which provides a signal to the base 18 for adjusting the voltage as necessary before providing power to the sensor. Although the aforementioned embodiments describe that power may be transferred via contact charging, it is understood that other techniques could be used to transfer power to sensor 12 and the item of merchandise 14. For example, inductive charging functionality could be employed for transferring power. Moreover, in some cases, the cable 20 may include one or more conductors for transferring power to the sensor 12 and/or the item of merchandise 14.

In some cases, the base 18 and the sensor 12 may include an electrical contact that detects that the sensor is lifted off of the base. For example, the sensor 12 and base 18 may each include a contact that is configured to engage one another when the sensor is supported on the base. These contacts may not transfer power. However, the contact on the base 18 may communicate with the PCB to indicate when the sensor 12 has been lifted off of the base and to cease transferring power to the electrical contacts 28, 40. This arrangement of contacts may reduce arcing and power surges when the sensor 12 is placed back on the base 18 since power will no longer be transferred to the contacts on the base after the sensor is lifted.

Figure 3:
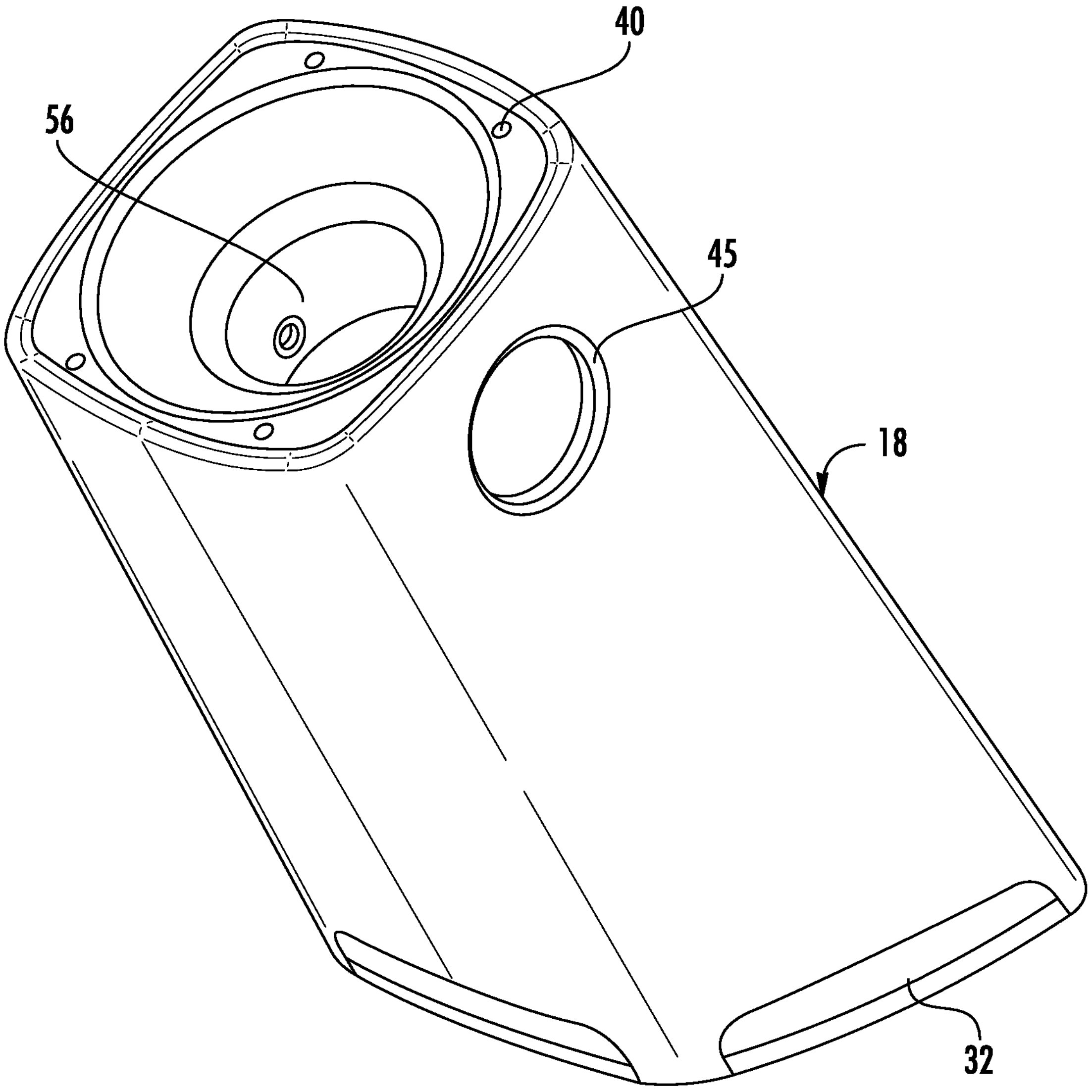
FIG. 3 is a perspective view of the base according to one embodiment of the present invention.
Figure 8:
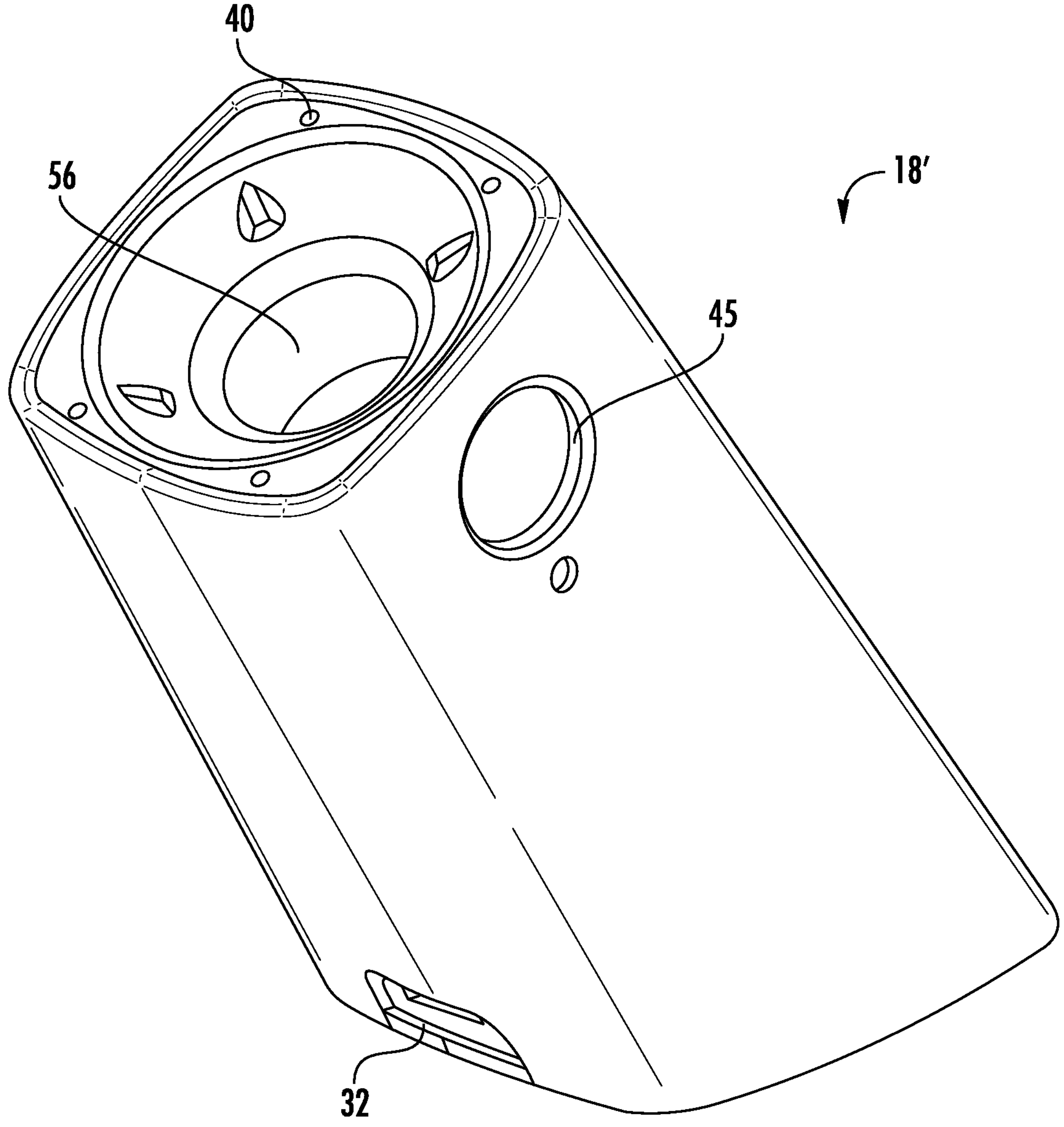
FIG. 8 is a perspective view of a base according to one embodiment of the present invention.
Figure 9:
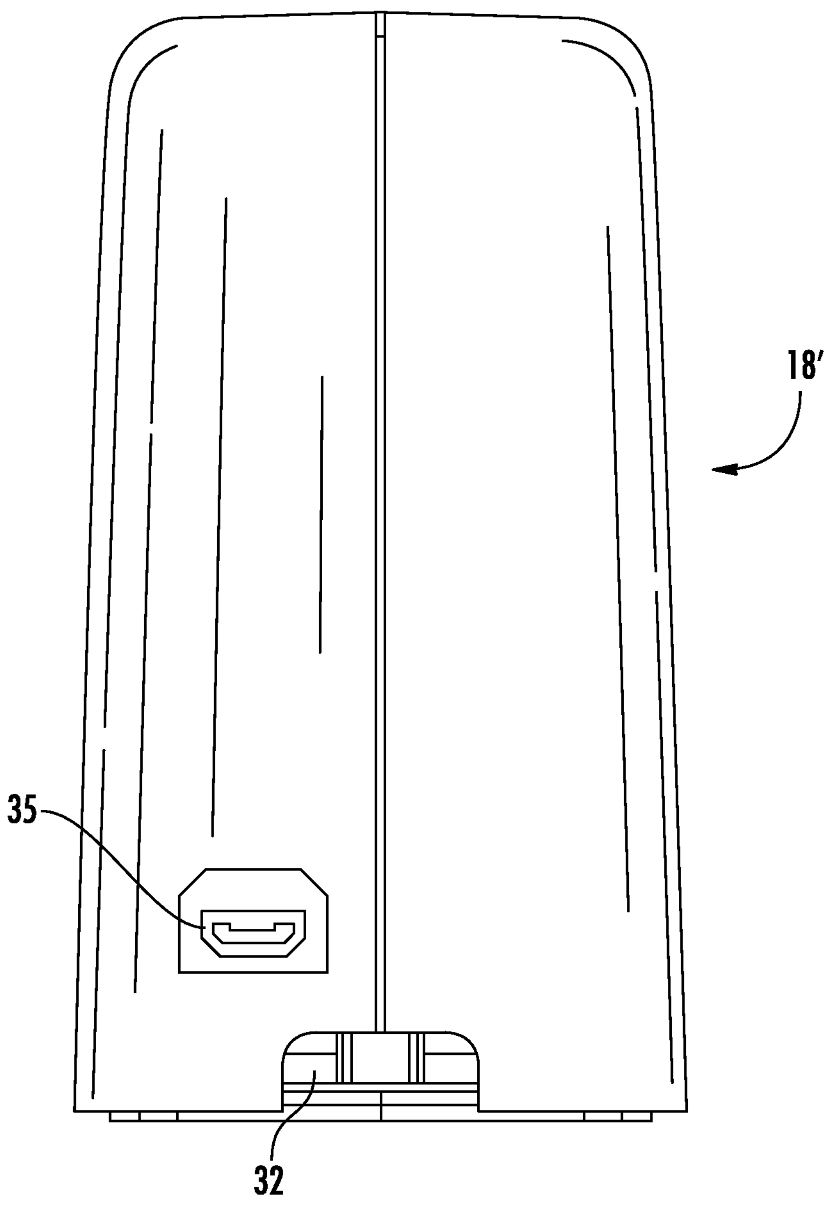
FIG. 9 is a rear view of the base shown in FIG. 8.

The base 18 may include one or more openings 32 defined about its perimeter for facilitating sound transfer from within the base. Thus, where the base 18 includes an alarm 48, the openings 32 may allow for sound to be more readily transmitted from the base. In the embodiment shown in FIG. 3, four openings 32 are defined about the perimeter of the base 18 adjacent to the display surface 25, although any number of openings may be used if desired. For example, FIGS. 8-9 show another embodiment of a base 18'. In this embodiment, the base 18' has a different base configuration, namely, a pair of openings 32 defined on the front and rear surfaces of the base.

Figure 10:
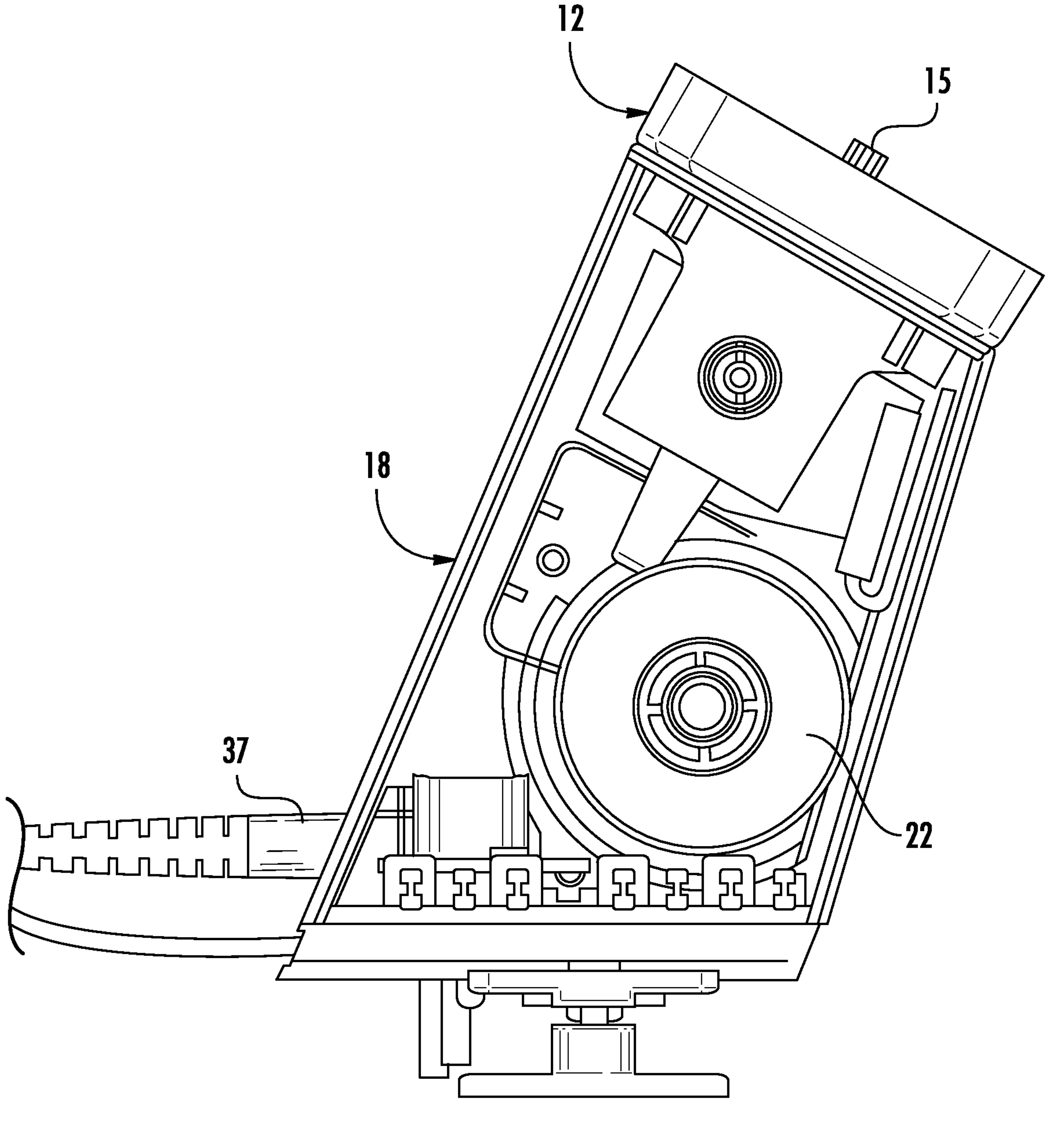
FIG. 10 is a side view of a base and a recoiler according to one embodiment of the present invention.

Furthermore, the base 18, 18' may include one or more auxiliary ports 35 for connecting to corresponding auxiliary devices for the item of merchandise 14 (see, e.g., FIGS. 9-10). Thus, in addition to securing an item of merchandise 14 and electrically connecting to a power cord and associated input power source 38, the base 18, 18' may be configured to electrically connect to an auxiliary device, such as, for example, an auxiliary device for the item of merchandise 14 on display (e.g., a stylus, speaker, keyboard, Bluetooth device, etc.). The auxiliary port 35 may be an input port (e.g., a micro-USB port) that is configured to receive a corresponding input connector 37 on the auxiliary device (see, e.g., FIG. 10). When the auxiliary device is connected to the auxiliary port 35, the auxiliary port may be configured to receive power, if necessary, and/or define a sense loop that may be used to detect various security events associated with the auxiliary device, such as the auxiliary device being removed from the base 18, 18' in an unauthorized manner. The auxiliary port 35 may be part of the same sense loop defined with the sensor 12 and the cable 20, or may define a separate sense loop. In the instance where the auxiliary port 35 is configured to provide power, the charging circuit may be configured to determine the power requirements of the auxiliary device and provide the necessary power level to effectuate charging. In some cases, the charging circuit may be configured to reduce the amount of power being provided to the sensor 12 and/or the item of merchandise 14 so that power may be provided to the auxiliary device while still facilitating charging of the sensor and/or the item of merchandise. Therefore, the auxiliary port 35 allows an auxiliary device to be displayed and used by a prospective consumer in connection with an item of merchandise 14, while the retailer is able to also power and protect both the item of merchandise 14 and the auxiliary device from theft with a single security device rather than requiring two separate security devices.

It is understood that the cable 20 may be any suitable cord, tether, or the like. In addition, the cable 20 may include one or more electrical conductors for transmitting electrical, security, and/or communication signals. In addition, the cable 20 may be a single strand, multi-strand, or braided. The cable 20 may be flexible to facilitate extension and retraction relative to the recoiler 22, and in some embodiments, may be formed of a cut-resistant material. Furthermore, the cable 20 may have various cross sections, such as round or flat.

In one embodiment, an end of cable 20 may be mechanically and optically connected to the sensor 12. Thus, the cable 20 may not be electrically connected to the sensor 12 in any way, and the conductors in the cable are electrically isolated from the power transmitted to the sensor and the item of merchandise 14. In one embodiment, the sensor 12 may define an opening for receiving an end of the cable 20. In some embodiments, the end of the cable 20 includes an optical transceiver 42 for communicating with the sensor 12 and/or the item of merchandise 14. Likewise, the sensor 12 may include an optical transceiver 42 for communicating with the optical transceiver at the end of the cable 20 (see, e.g., FIG. 1). The optical transceivers 42 may be used to transmit optical signals in predetermined sequences or patterns and/or receive optical signals and convert the optical signals into electrical signals. In addition, the optical transceivers 42 may be separated by an air gap so as to not be in physical contact with one another and such that the optical transceivers are electrically isolated from one another. The cable 20 may include one or more conductors for providing power to the optical transceiver 42, as well as sending and receiving signals to and from the optical transceiver in the sensor 12. Similarly, the sensor 12 may include a power source 46 that is configured to provide power to the sensor for interpreting signals provided by the optical transceiver 42, as well as power the optical transceiver for sending and receiving optical signals. Furthermore, the end of the cable 20 may be mechanically coupled to the sensor 12 using a variety of techniques and may be configured to rotate or swivel in some embodiments. In one example, the optical transceivers 42 may be configured to rotate relative to one another. Moreover, the conductors in the cable 20 may be connected to the optical transceiver 42 and a printed circuit board (PCB) or circuitry at one end. Similarly, the connector 17 may include conductors connected to the optical transceiver 42 and a printed circuit board or circuitry in the sensor 12. The end of the cable 20 may include a releasable connector that is configured to contain the optical transceiver 42 and PCB. The releasable connector may be configured to mechanically engage a cooperating connector on the sensor 12. Moreover, FIG. 1 shows that in the case where the charging circuit and sense loop are separate and electrically isolated from another, a cable 44 may be used to electrically connect the contacts 40 and the input power source 38 along with any other data connections.

The optical transceivers 42 may be used to define a sense loop and detect various security events, such as when the cable 20 is cut or removed from the sensor 12 and/or the connector 17 is removed from item of merchandise 14 in an unauthorized manner. It is understood that various types of sensing techniques may be used for detecting when the cable 20 is attached or detached from the sensor 12 and/or item of merchandise 14, as well as when the connector 17 is removed from the item of merchandise. For example, the optical transceiver 42 at the end of the cable 20 may communicate an optical signal to the optical transceiver in the sensor 12 where the sensor can determine that the item of merchandise 14 and the cable 20 are secure. The optical transceiver 42 in the sensor 12 may then communicate an optical signal to the optical transceiver at the end of the cable 20 to indicate that the item of merchandise 14 is secure. The optical signals may be coded in a particular manner that is recognizable and/or expected for determining whether a security event has occurred. Should the optical signals be interrupted or an unexpected optical signal is received, the base 18 or other alarm unit may detect the interruption and generate an alarm signal. For example, the base 18 or other alarm unit may be configured to generate an audible and/or a visible alarm. For example, FIG. 1 shows that the base 18 may include an alarm 48, such as a piezoelectric device, for generating an audible alarm. The sensor 12 may likewise or alternatively include an alarm 48 for generating an audible and/or a visible alarm. The base 18 may be configured to be armed and/or disarmed via a key, such as a wireless key. For instance, FIG. 1 shows that the base 18 may include a port 45 for facilitating communication with a key. In some embodiments, the optical transceiver(s) is similar to that disclosed in U.S. Provisional Application No. 62/167,382, entitled Merchandise Security System with Optical Communication and filed on May 28, 2015, and U.S. application Ser. No. 15/163,846, entitled Merchandise Security System with Optical Communication and filed on May 25, 2016, the entire contents of which are incorporated herein by reference.

Figure 6:
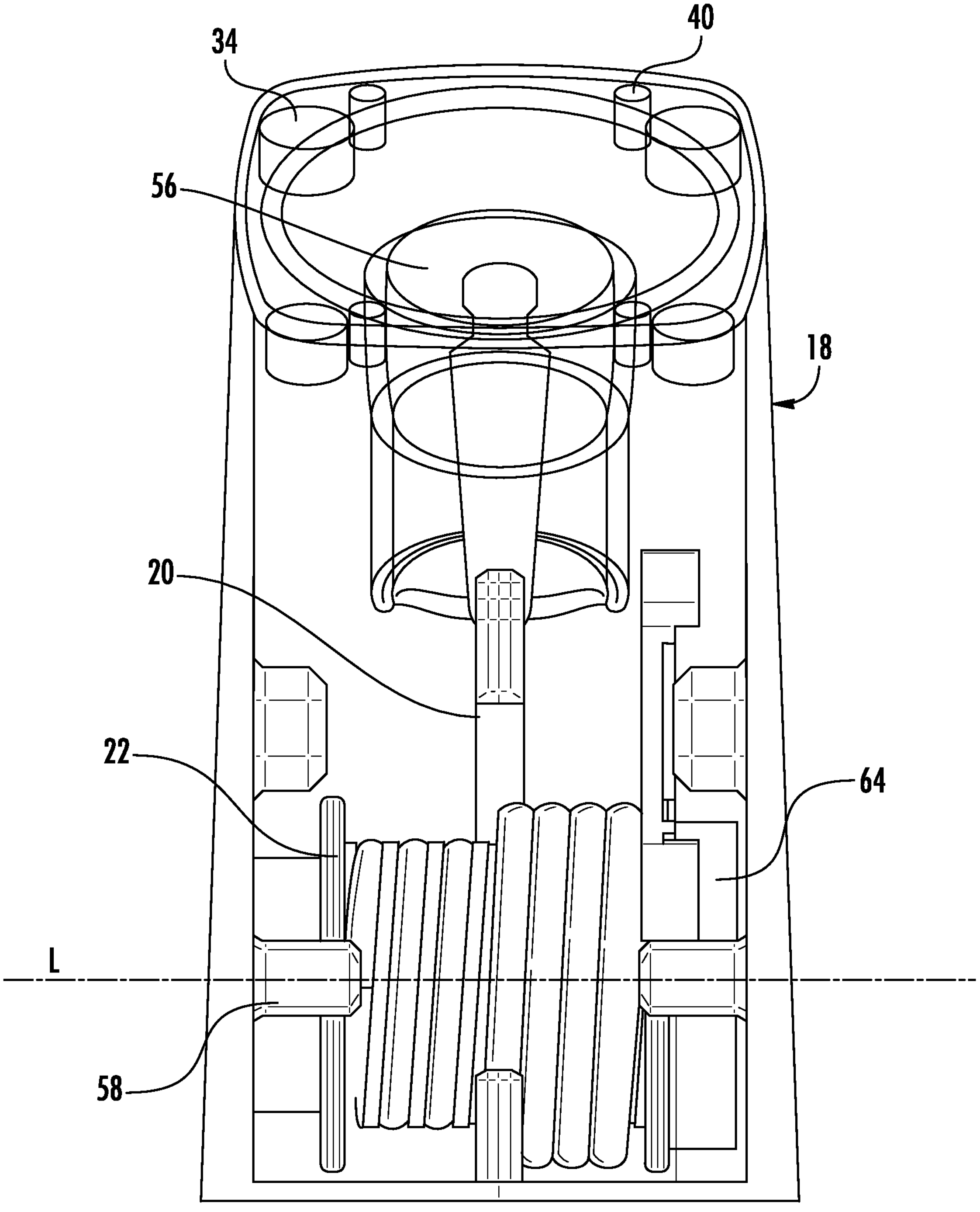
FIG. 6 is a front view of a merchandise security system according to one embodiment of the present invention.
Figure 7:
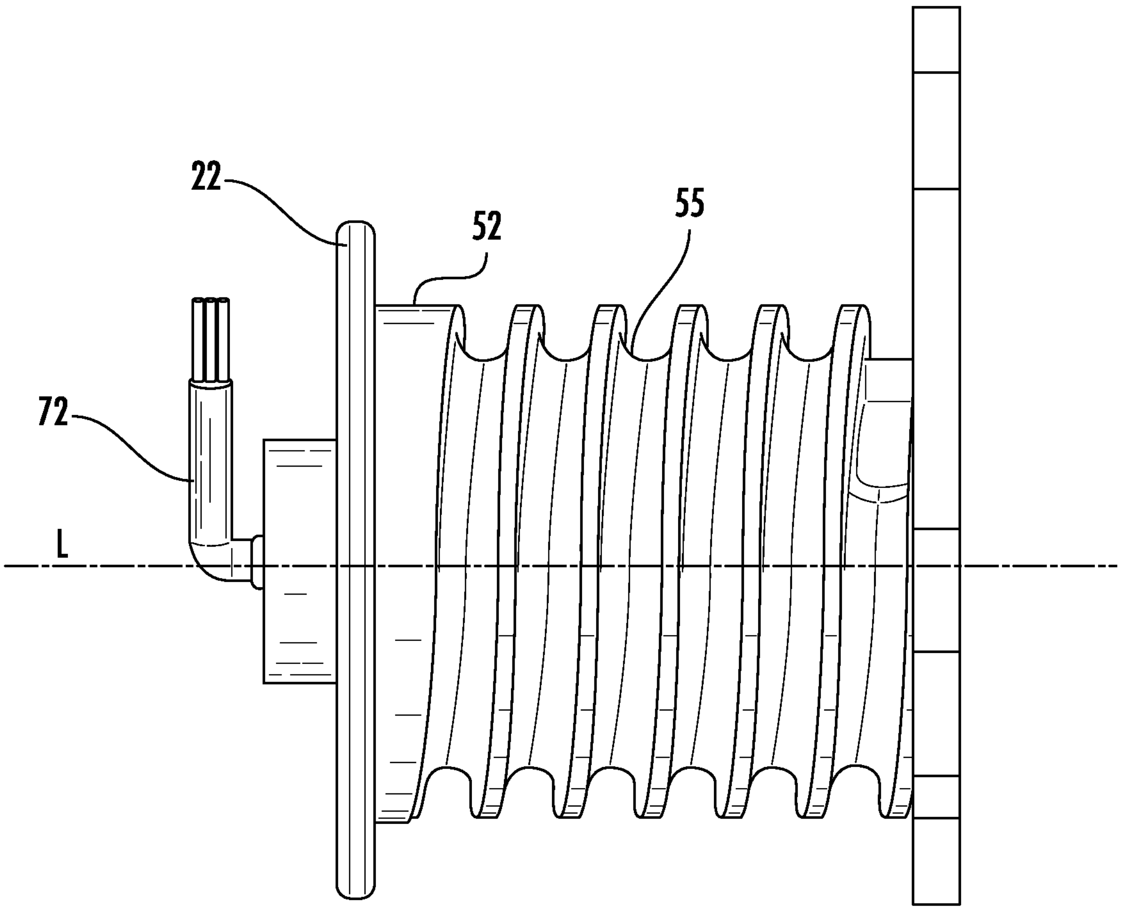
FIG. 7 is a front view of a recoiler according to one embodiment of the present invention.

FIGS. 2-7 illustrate embodiments of a recoiler 22. The recoiler 22 generally includes a spool 52 or rotatable member that is configured to rotate within the base 18. The base 18 defines an opening 56 configured to receive the cable 20 so that the cable can be extended and retracted relative to the base as the cable is unwound from and wound onto the spool 52. The cable 20 may be wound about the spool 52 along an axis "L", which may be perpendicular or about perpendicular (e.g., 85-90 degrees) to the axis of the cable 20. As shown in FIG. 7, the outer surface of the spool 52 may include a helical recess 55 that extends along at least a portion of the length of the spool. The helical recess 55 may be sized and configured to receive a portion of the cable 20 as it is wound about the spool 52. The helical recess 55 may define a plurality of windings about the spool 52. As the spool 52 is rotated via tension being applied on the cable 20, the spool is able to rotate about a spindle 58 or other support member. A spring may be used to urge the cable 20 back into the housing 54 as tension is removed from the cable. In some examples, the helix angle of the helical recess 55 is between 0 and about 20 degrees (+/−1 degree), between 0 and about 10 degrees (+/−1 degree), or between 0 and about 5 degrees (+/−1 degree). Moreover, in some embodiments, the pitch of the helical recess 55 may be between 0 and about 5 mm (+/−1 mm), between 0 and about 10 mm (+/−1 mm), or between 0 and about 15 mm (+/−1 mm). In some cases, the spool 52 may be similar to that disclosed in U.S. Provisional Application No. 62/189,274, entitled Winch Recoiler for a Merchandise Security Device and filed on Jul. 7, 2015, the entire contents of which are incorporated herein by reference.

In some cases, at least one winding of cable 20 is configured to be wound about the spool 52, and a plurality of windings may be defined about the spool as the cable is wound on the spool. In one example, the length of the spool 52 may be about the same as the outer diameter of the spool, or the length of the spool may be longer than the outer diameter of the spool. The cable 20 may be configured to wrap about the helical recess 55 from one end of the spool 52 to the other end of the spool. In one embodiment, the helical recess 55 may allow for a single row of cable 20 to be wound about the spool 52 in a predetermined helical direction. Once the cable 20 has been wound about the helical recess 55 in one helical direction as the cable is withdrawn into the base 18, the cable is configured to wind about the spool and the first layer of cable in a second helical direction to form a second layer of cable. Thus, the helical recess 55 may facilitate a first row of cable 20 being wrapped about the spool 52 in one direction, and the cable 20 may be biased towards a direction opposite to the first helical direction such that the cable forms a second layer of cable. Due to the helical recess 55 urging the cable 20 in a first helical direction, the cable may be biased to wind in an opposite direction once the cable has been wound to the end of the helical recess. Furthermore, FIG. 6 shows that the second layer of cable 20 may have a length that is about half (e.g., +/−5 mm) of the first layer of cable. In this way, the second layer of cable 20 may end at about the midpoint (e.g., +/−5 mm) of the spool 52 thereby allowing the end of the cable to align with the opening 56 of the base 18. As such, the helical recess 55 may allow for more compact and orderly cable management within the base 18.

The recoiler 22 may also include a spring 64 in some embodiments. For example, the spring 64 may be secured to one end of the spool 52. In one embodiment, the spring 64 is a variable-force or variable-torque spring, a constant-force or constant-torque spring, or a power spring. When tension on the cable 20 is removed, the spring force of the spring 64 causes the spool 52 to rotate in an opposite direction thereby returning the cable 20 onto the spool.

Figure 4:
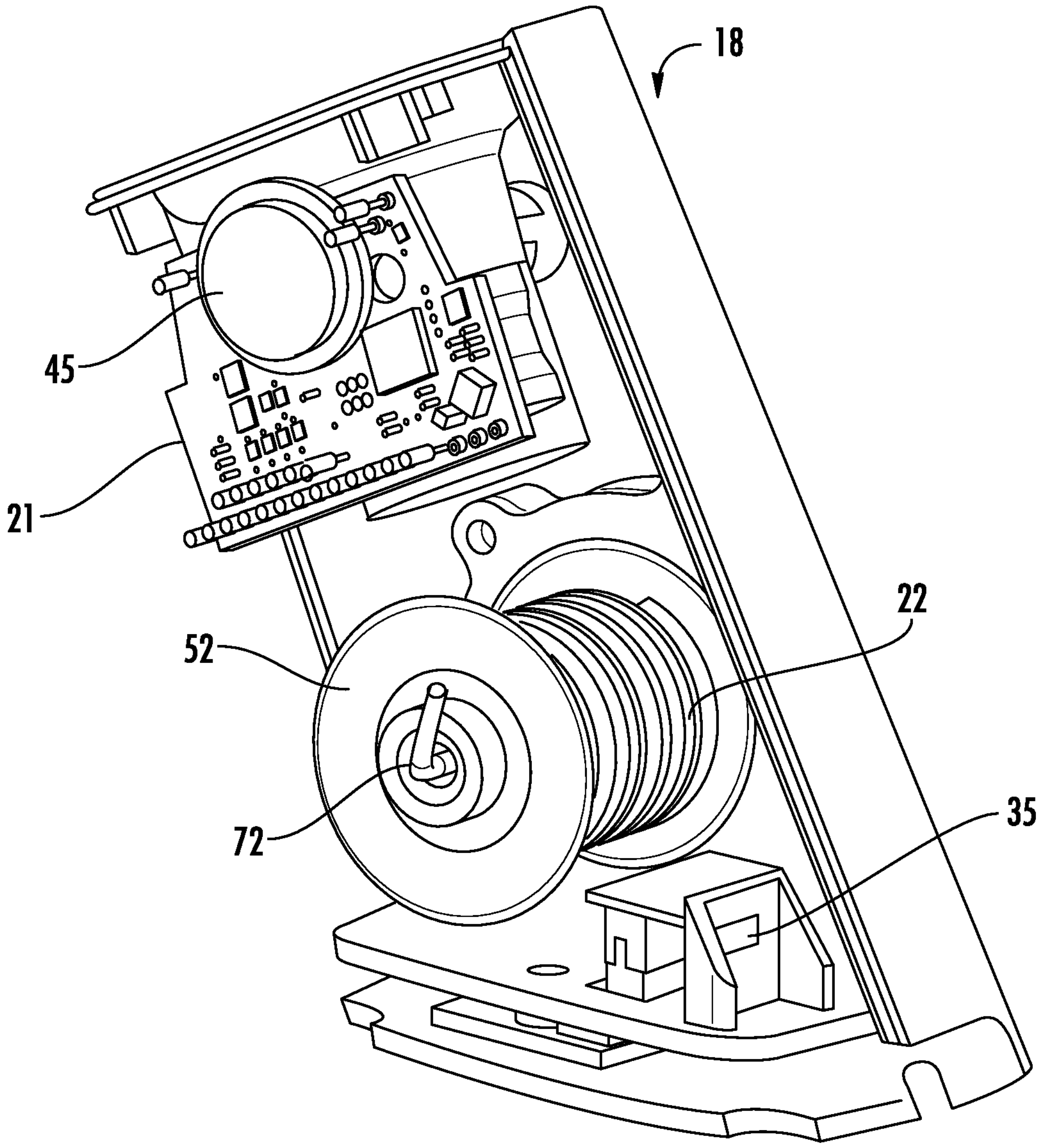
FIG. 4 is a partial perspective view of the base shown in FIG. 3.
Figure 5:
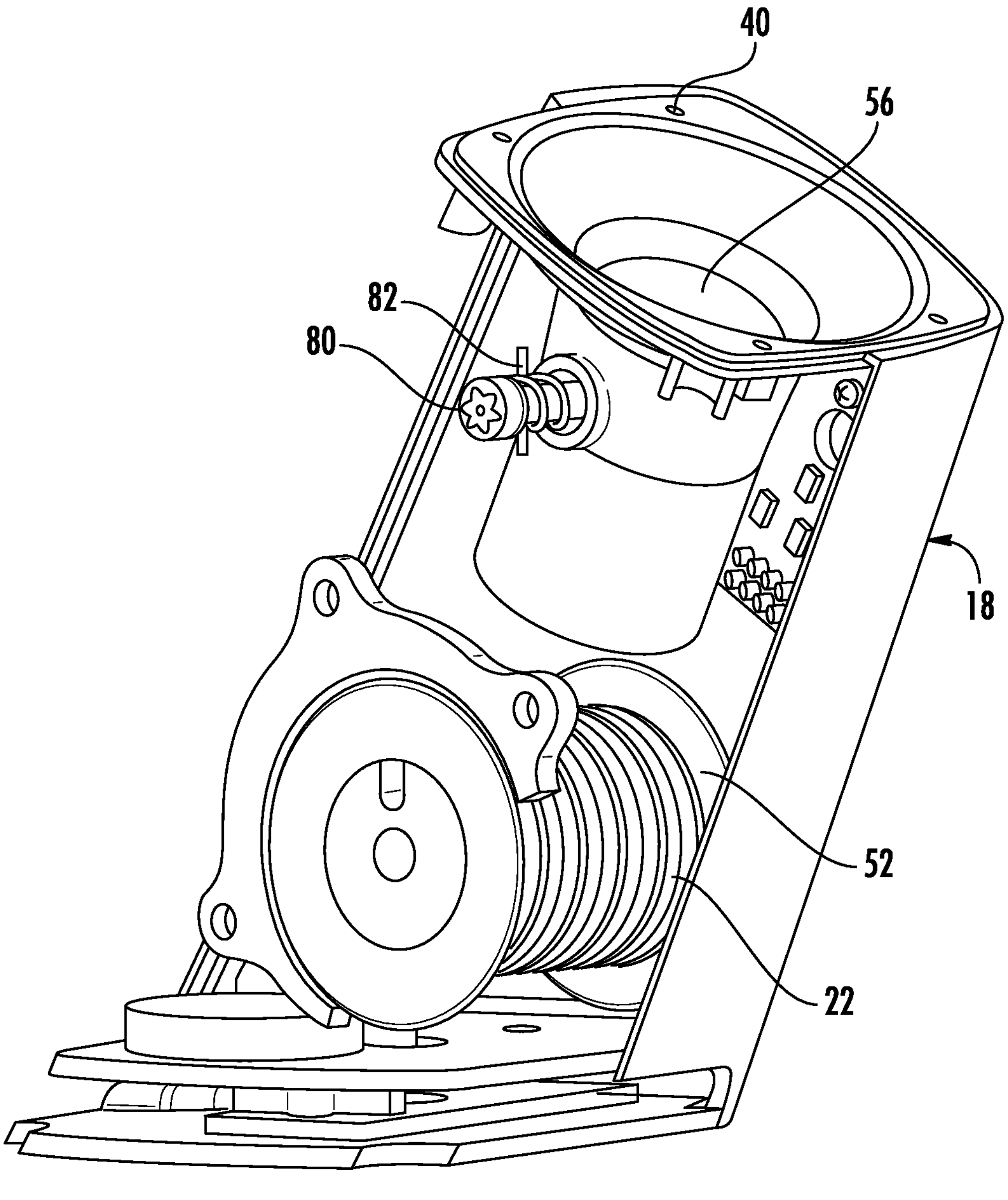
FIG. 5 is another partial perspective view of the base shown in FIG. 3.

As discussed above, the cable 20 may include one or more electrical conductors and the base 18 may facilitate power transfer to the sensor 12. In order to facilitate an electrical connection with the cable 18, such as for transmitting and receiving power, security, and/or data signals, the recoiler 22 may include a slip ring 72. The slip ring 72 may be electrically connected to the cable 20 and a printed circuit board 21, such as with one or more electrical wires. The slip ring 72 may be configured to rotate with the spool 52 in some cases. And FIGS. 4 and 7 show that in some embodiments the slip ring 72 may be mounted at an end of the spool 52 opposite the spring 64.

In another embodiment, a locking feature may be provided for locking the sensor 12 to the base 18. In this regard and with reference to FIG. 5, a lock mechanism 80 may be configured to lock the sensor 12 to the base 18 when the sensor is seated on the base 18 thereby prevent the spool 52 from rotating and, therefore, the cable 20 from being retracted relative to the base. Such a lock mechanism 80 may be useful for retailers who wish to secure the sensor 12 and item of merchandise 14 to the base 18, such as after hours, since the cable 20 will be inaccessible due to the inability to lift the sensor from the base. In the illustrated embodiment, the lock mechanism 80 includes a locking member 82 that is configured to rotate between locked and unlocked positions. In this instance, the locking member 82 may be a proprietary fastener. In another embodiment, the lock mechanism 80 may be configured to engage the spool 52 to prevent rotation thereof.

Embodiments of the present invention may provide several advantages. For example, the recoiler allows greater flexibility in installing the recoiler since the recoiler may be disposed entirely within the base. In addition, the size of the base may be more flexible given that the length of the recoiler may be reduced where the cable is configured wrap about itself in an orderly manner. Moreover, the configuration of the spool and helical recess may provide for a better user experience given that the pull force on the cable may be more constant and less than conventional recoilers.

The foregoing has described one or more embodiments of recoilers, merchandise security systems, and methods for displaying and protecting an article of merchandise from theft. Those of ordinary skill in the art will understand and appreciate that numerous variations and modifications of the invention may be made without departing from the spirit and broad scope of the invention. Accordingly, all such variations and modifications are intended to be encompassed by the appended claims.

That which is claimed is:

1. A merchandise security system for displaying and protecting an article of merchandise and an auxiliary device of the article of merchandise from theft, comprising:

a sensor that is secured to the article of merchandise and that detects removal of the article of merchandise from the sensor;

a base that removably supports the sensor and the article of merchandise thereon;

a cable operably connected to the sensor, the opposite end of the cable operably connected to the base; and an auxiliary port housed by the base and configured to electrically connect to the auxiliary device, wherein the auxiliary device is an electronic device configured to interact with the article of merchandise, wherein the auxiliary port is configured to receive an input connector operably connected to the auxiliary device for electrically connecting the auxiliary device to the auxiliary port, wherein the base transfers power to the auxiliary port for powering the auxiliary device, and wherein a security signal is transmitted through the auxiliary port that is used to detect removal of the auxiliary device from the base.

2. The merchandise security system of claim 1, wherein the security signal is configured to be transmitted through the auxiliary port for detecting removal of the input connector from the auxiliary port.

3. The merchandise security system of claim 1, wherein the cable comprises one or more electrical conductors defining a sense loop for conducting the security signal, and wherein the sense loop is further defined in the auxiliary port.

4. The merchandise security system of claim 1, wherein the security signal is configured to be transmitted through the cable and the auxiliary port for detecting the cable being cut, shorted, or disconnected.

5. The merchandise security system of claim 1, further comprising a recoiler comprising a rotatable member, wherein the cable is configured to be unwound from and wound on the rotatable member as the cable is extended and retracted.

6. The merchandise security system of claim 1, wherein an end of the cable comprises an optical transceiver for communicating optical signals with the sensor and detecting a security event associated with the sensor, the cable, or the item of merchandise.

7. The merchandise security system of claim 6, wherein the cable comprises a releasable connector configured to releasably engage the sensor, wherein the releasable connector is configured to contain the optical transceiver.

8. The merchandise security system of claim 6, wherein the cable comprises one or more electrical conductors for providing power to the optical transceiver.

9. The merchandise security system of claim 6, wherein the sensor contains an optical transceiver for communicating optical signals with the optical transceiver of the cable.

10. The merchandise security system of claim 9, wherein the optical transceiver of the cable and the optical transceiver of the sensor are configured to communicate with one another to determine if the cable has been cut or disconnected.

11. The merchandise security system of claim 9, further comprising a connector configured to electrically connect the sensor to the article of merchandise, wherein the optical transceiver of the cable and the optical transceiver of the sensor are configured to communicate with one another to determine if the connector has been removed from the article of merchandise.

12. The merchandise security system of claim 9, wherein the optical transceiver of the cable and the optical transceiver of the sensor are configured to rotate relative to one another.

13. The merchandise security system of claim 9, wherein the optical transceiver of the cable and the optical transceiver of the sensor are configured to communicate with one another to define a sense loop through the cable.

14. The merchandise security system of claim 1, further comprising a printed circuit board housed within the base and electrically connected to the cable with a plurality of electrical wires, wherein the auxiliary port is disposed on the printed circuit board.

15. The merchandise security system of claim 1, wherein the auxiliary port is configured to electrically connect to an auxiliary device comprising a Bluetooth device configured to operate with the article of merchandise.

16. The merchandise security system of claim 1, wherein each of the sensor and the base comprises an alarm for generating an audible and/or a visible alarm.

17. The merchandise security system of claim 1, wherein the base is configured to be disarmed with a wireless key.

18. A method for displaying and protecting an article of merchandise and an auxiliary device of the article of merchandise from theft, comprising:

securing a sensor to the article of merchandise that detects removal of the article of merchandise from the sensor;

attaching a base to a support surface that removably supports the sensor and the article of merchandise thereon, the base comprising an auxiliary port;

connecting a cable to the sensor, the opposite end of the cable operably connected to the base; and connecting an input connector to the auxiliary port for electrically connecting the auxiliary device to the auxiliary port, wherein the auxiliary device is an electronic device configured to interact with the article of merchandise, wherein the base transfers power to the auxiliary port for powering the auxiliary device, and wherein a security signal is transmitted through the auxiliary port that is used to detect removal of the auxiliary device from the base.

* * * * *